Dec. 13, 1966 R. K. HO 3,290,761
METHOD OF MANUFACTURING AND ATTACHING
NON-ELECTROLYTIC TANTALUM CAPACITORS
Filed July 14, 1964
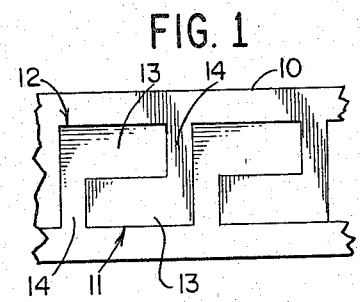
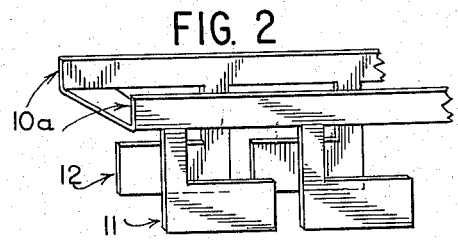
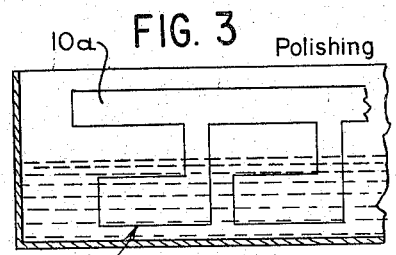
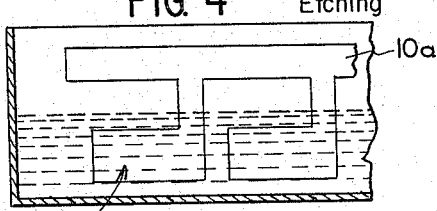
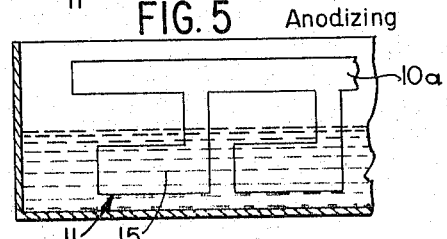
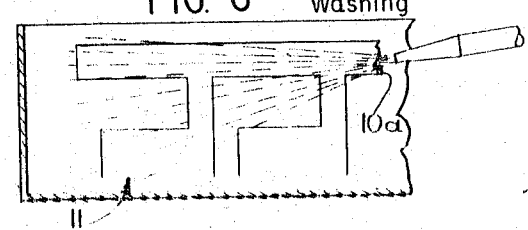
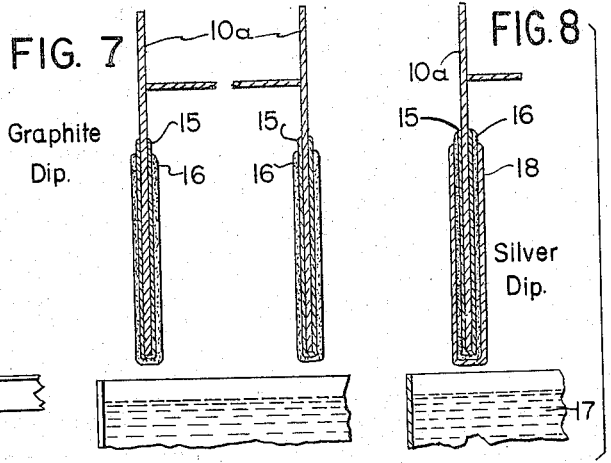
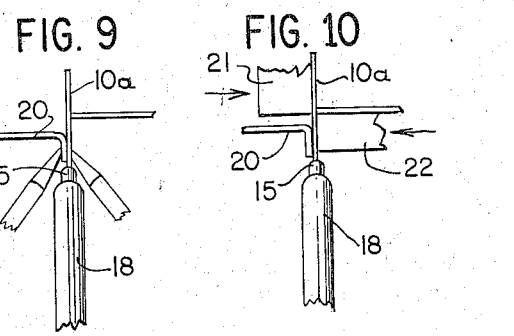
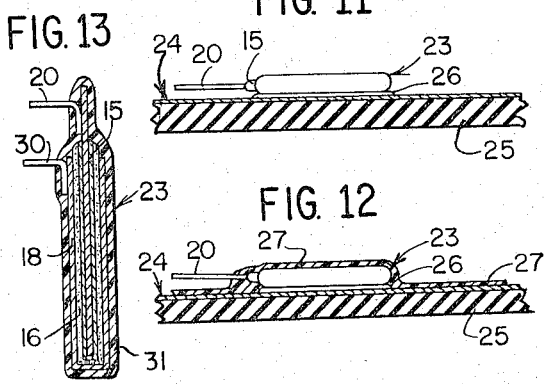
Inventor
ROLAND K. HO
By
Attys.

United States Patent Office 3,290,761
Patented Dec. 13, 1966

3,290,761
METHOD OF MANUFACTURING AND ATTACH-
ING NON-ELECTROLYTIC TANTALUM CAPACI-
TORS
Roland K. Ho, Independence, Kans., assignor to Electra
Manufacturing Company, Independence, Kans., a cor-
poration of Missouri
Filed July 14, 1964, Ser. No. 382,490
5 Claims. (Cl. 29—155.5)

The present invention relates generally to tantalum capacitors and, more particularly, to an economical method of manufacturing solid state, non-electrolytic tantalum capacitors having improved characteristics.

A great variety of different tantalum capacitors have been proposed heretofore. In general, most of the capacitors which have been previously proposed can be divided into two classes: electrolytic capacitors, and non-electrolytic or solid state capacitors. The electrolytic capacitors include a tantalum anode with a layer of tantalum oxide formed on the surface thereof to provide a dielectric film, a suitable cathode spaced away from the anode, and either a liquid or solid electrolyte disposed between and electrically connecting the anode and cathode. In the non-electrolytic or solid state tantalum capacitors, the electrolyte is eliminated and the anode and cathode are in direct contact with an intermediate dielectric layer, such as tantalum oxide. Although the solid state tantalum capacitors offer a number of advantages over the other types of capacitors, they have not achieved widespread commercial success, mainly because of difficulties encountered in manufacturing such capacitors on a commercial scale.

It is, therefore, a primary object of the present invention to provide an improved method of manufacturing solid state tantalum capacitors which can be readily practiced on a commercial scale. A related object of the invention is to provide such a method in which a tantalum oxide dielectric can be formed by anodizing the tantalum electrode of the capacitor without subjecting an entire circuit substrate to the anodizing medium.

It is another object of the present invention to provide an improved method of manufacturing solid state tantalum capacitors having improved characteristics. Thus, it is one object of the invention to provide a method of manufacturing solid state tantalum capacitors having increased capacitance per unit volume, thereby providing improved capacitor volume efficiency.

It is a further object of the present invention to provide an improved method of the foregoing type which can be used to manufacture the improved tantalum capacitors commercially on a large scale while achieving uniform characteristics over a large number of capacitors. A related object is to provide such a method which is highly reproducible in that it is capable of producing large numbers of solid state tantalum capacitors having characteristics falling within close tolerances.

Other objects and advantages of the invention will become apparent upon reading the attached detailed description and appended claims, and upon reference to the drawings, in which:

FIGURE 1 is a plan view of a strip of tantalum foil from which a plurality of tantalum electrodes have been stamped in accordance with the present invention;

FIG. 2 is a perspective showing the tantalum strip of FIGURE 1 with the various tantalum electrodes bent at an angle to the common header formed by the residual body portion of the original strip;

FIG. 3 is a fragmentary side elevation illustrating the polishing treatment of the tantalum electrodes connected to their common header;

FIG. 4 is a fragmentary side elevation illustrating the optional etching treatment of the tantalum electrodes after they have been polished and cleaned;

FIG. 5 is a fragmentary side elevation illustrating the anodizing treatment of the tantalum electrodes to form a dielectric layer of tantalum oxide on the surfaces thereof;

FIG. 6 is a fragmentary side elevation illustrating the washing of the anodized tantalum electrodes;

FIG. 7 is an end view in section illustrating the graphite coating of one of the tantalum electrodes;

FIG. 8 is an end view in section illustrating the application of the second electrode to the dielectric layer formed by the anodizing treatment;

FIG. 9 is an end elevation showing the welding of an electrical lead to the exposed end portion of one of the tantalum electrodes;

FIG. 10 is an end elevation view, partially in section, showing the use of a pair of cutting dies to sever one of the tantalum electrodes from its header;

FIG. 11 is an end elevation, partially in section, showing the integration of one of the severed capacitators with a circuit deposited on the surface of an insulating substrate;

FIG. 12 is an end elevation view, partially in section, showing the integrated capacitor of FIGURE 11 encapsulated in a protective insulating coating; and FIG. 13 is an end elevation, partially in section, showing a discrete tantalum capacitor formed in accordance with this invention and encapsulated in a protective insulating casing.

While the invention will be described in connection with a certain preferred embodiment, the invention is susceptible of various modifications and alternative constructions, and it is to be understood that the invention is not to be limited to the specific forms disclosed but, on the contrary, it is intended to cover all modifications and alternative constructions falling within the spirit and scope of the invention as expressed in the appended claims.

Turning now to the drawings, in FIGURE 1 there is shown a strip of tantalum foil 10 from which the tantalum electrodes 11 and 12 employed in this invention are formed. The electrodes 11 and 12 may be cut from the foil by means of a suitable stamping die designed to provide the desired electrode shape. In the particular embodiment illustrated in the drawings, the electrodes 11, 12 are generally flag-shaped with each electrode having a rectangular body portion 13 and a relatively narrow base or neck portion 14.

In accordance with the present invention, each of the tantalum electrodes is formed so that it remains connected to the tantalum sheet at the end of the base or neck portion, with the remaining body portion of the sheet serving as a common header for subsequent processing of the various electrodes formed therefrom. The electrodes are then bent away from at least a portion of the main body portion of the sheet so that adjacent electrodes are spaced apart, subjected to an anodizing treatment to form a layer of tantalum oxide on the surface of each electrode (the tantalum oxide providing a dielectric layer integral with each electrode) and then coated with a suitable metal electrode to complete the capacitor. Thus, as illustrated in FIGURE 2, the upper end of the neck portion 14 of each of the tantalum electrodes 11, 12 remains connected to the residual body portion of the tantalum foil 10, so that the electrodes can be bent at an angle to the plane of the foil sheet. Consequently, the residual portion of the foil 10 forms a common header which interconnects the plurality of electrodes 11, 12, and which can be used for handling the electrodes as a group for subsequent processing. In the particular embodiment illustrated, both the electrodes 11, 12 and the longitudinal side portions 10a of the header are at an angle of approximately 90° to the plane of the original foil sheet, but this angle is not critical and it will be apparent from the ensuing discussion that various other angles, either greater or less than 90°, can be employed. Similarly, it is not necessary to bend any part of the residual portion of the foil sheet, as long as the electrodes are bent so as to be spaced away from each other.

In accordance with one aspect of the invention, the electrodes are designed to interfit each other so that a single continuous die cut is effective to form two series of electrodes from a single tantalum strip. Thus, as shown in FIG. 1, the alternate flag-shaped electrodes 12 are inverted with respect to the intervening electrodes 11 so that the two series of electrodes 11, 12 interfit each other. This permits both series of electrodes to be stamped from the tantalum strip simultaneously by a single continuous die cut, with the electrodes of each series remaining connected to the common header formed by the residual metal remaining at the respective longitudinal edges of the strip.

In order to prepare the bent tantalum electrodes for the anodizing treatment, both series of electrodes are polished and cleaned while still connected to the header, as illustrated in FIGURE 3. The polishing may be suitably effected by immersing the electrodes in a chemical polishing solution such as a mixture of 52 ml. of $H_2SO_4$, 22 ml. of $HNO_3$, and 16 ml. of HF for about 15 seconds. The electrodes are then cleaned by washing them in running water for 15 minutes, followed by boiling for about 15 minutes in a suitable detergent. Finally, the electrodes are washed in running deionized water for approximately two hours. It will be appreciated that this is only one example of a suitable polishing and cleaning treatment, and it is contemplated that various other treatments will be readily apparent to those skilled in the art.

In accordance with one aspect of this invention, the tantalum electrodes are subjected to an etching treatment prior to the anodizing step, for the purpose of increasing the surface area of the tantalum electrodes. It has been found that this etching treatment considerably increases the surface area of the tantalum electrodes and, therefore, increases the resultant capacitance per unit volume. In one example of the invention, a series of tantalum electrodes connected to a common header were etched, as illustrated in FIGURE 4, in a solution of potassium bromide in methanol at room temperature at the rate of 5 amperes per square inch for a period of 15 minutes. This etching treatment was found to double the capacitance of the resultant capacitors, as compared with similar capacitors prepared without the etching treatment. Moreover, the etching treatment was found to provide better adhesion of the subsequently applied metal electrode, even though this electrode was not applied until after the formation of the dielectric layer of tantalum oxide on the surface of the tantalum electrode.

For the purpose of forming a layer of dielectric material on the surface of each tantalum electrode, the tantalum electrodes are subjected to an anodizing treatment, while they are still connected to a common header, so as to form a layer of tantalum pentoxide integral with each tantalum electrode. As illustrated in FIGURE 5, an end portion of each electrode 11, 12 is maintained free of the oxide layer to permit the attachment of electrical leads in direct contact with the tantalum electrodes. The anodizing treatment may be effected by immersing the series of electrodes in a suitable electrolyte, such as a 4% by volume aqueous solution of $H_3PO_4$ for example, and connecting the common header of the electrodes to the positive terminal of a suitable power supply. A suitable cathode, such as a tantalum plate for example, is also immersed in the electrolyte and connected to the negative terminal of the power supply.

The anodizing treatment may be carried out in a number of suitable electrolytes, either aqueous or non-aqueous, and the electrolyzing period, temperature, and current density may be varied in accordance with the particular dielectric thickness and other characteristics desired in the final capacitor. For example, with the 4% $H_3PO_4$ solution mentioned above, satisfactory results are obtained with an electrolytic bath temperature of 92° C., plus or minus 3° C., and a current density not exceeding 20 milliamperes per square inch. The duration of the anodizing treatment is determined by the desired voltage, current density, and final leakage current, which should not exceed 10 microamperes per square inch. The thickness of the resultant tantalum oxide dielectric film 15 formed by the anodizing treatment varies proportionately with the anodizing voltage, and has been found to increase at a rate of about 18 angstroms per volt D.-C. The capacitance is directly proportional to the area of the electrode and inversely proportional to the dielectric thickness. In one example of the present invention carried out in the above system, a tantalum anode having an area of one square inch was formed at 150 volts D.-C. (2700 angstroms thick $Ta_2O_5$) and resulted in a 0.5 mfd., 50 volt D.-C. capacitor. When the same size anode was formed at 30 volts D.-C., it was found to yield a 1.5 mfd. capacitor rated at 10 volts D.-C.

After the anodizing treatment has been completed, the resulting anodized electrodes are washed, dried, and then coated with graphite to provide good adherence of the oxide film to the metal electrode to be deposited thereon. Thus, the anodized tantalum electrodes may be washed for two hours in hot running deionized water, as shown in FIGURE 6, and then dried at 120° C. for 30 minutes. After drying, the electrodes are dipped in a water colloidal suspension of graphite just deeply enough to cover the main body portion of the electrodes but not the neck portions, as illustrated in FIG. 7, so as to coat the oxide layer 15 with a graphite film 16.

After the electrodes have been coated with graphite, they are dried again and coated with a layer of electrically conducting metal to form the other electrode on the surface of the oxide film. For example, referring to FIGURE 8, the electrodes may be dipped into a bath 17 of silver composition, such as Du Pont silver No. 7941, and then withdrawn and fired to form a thin silver film 18 over the graphite layer. The silver film 18 is preferably restricted to the main body portion 13 of the electrodes, a small distance away from the upper edge of the oxide layer 15, to insure that the two electrodes are continuously spaced apart by the intermediate dielectric layer of tantalum oxide.

The application of the second electrodes 18 completes a plurality of solid state tantalum capacitors which are still connected to the common header. An electrical lead 20 (see FIG. 9) is then bonded to the non-oxidized surface at the end of each neck portion 14 so as to be in direct electrical contact with the tantalum electrode 11 or 12 of the capacitor. The electrical lead 20 may consist of tinned nickel, for example, and may be welded, as illustrated in FIG. 9, to the desired area of the electrode neck 14. After the leads 20 have been attached, the capacitors are finally severed from their common header. As shown in FIG. 10, the upturned edge portions 10a of the residual metal header facilitate the severing of the capacitors by a pair of cooperating cutting dies 21 and 22.

In accordance with one aspect of the present invention, the severed solid state capacitors are integrated with an electrical circuit on an insulating substrate by bonding the exposed surface of the second capacitor electrode to the circuit substrate by means of a conductive cement, with the conductive cement being in electrical connection with the desired portion of the circuit. Thus, in FIG. 11 the capacitor 23 is integrated with an electrical circuit indicated at 24 on the surface of an insulating substrate 25 by means of a layer of conductive cement 26 applied over the exposed surface of the circuit 24. If desired, the capacitor could be bonded directly to the substrate 25 rather than to the circuit 24 deposited thereon. The conductive cement 26, which may be any suitable conductive cement such as conductive epoxy No. 3012 manufactured by the Epoxy Product Co., not only bonds the capacitor integrally to the circuit 24 and its substrate 25, but also serves as a direct electrical connection between the silver electrode 18 and the desired portion of the circuit. Since the conductive cement is initially in the form of a paste or liquid, the assembly is generally placed in an oven, after the capacitor has been properly positioned, and fired until the cement is cured to permanently bind each capacitor to the substrate. It will be appreciated that this method provides a miniature solid state tantalum capacitor which is integrally bonded to the integrated circuit and its supporting substrate, and yet is formed without subjecting the entire circuit substrate to the anodizing treatment or any of the other processing steps involved in producing the solid state capacitors. After the capacitor has been integrated with the circuit 24, it is preferably encapsulated in a protective insulating casing 27 (see FIGURE 12), such as by coating the entire circuit with a liquid epoxy such as "Epoxylite" resin, with the electrical lead 20 extending out through the casing 27 for connection to another portion of the circuit.

In cases where the capacitor is to be used as a discrete circuit element rather than being directly integrated with a circuit on the surface of a substrate, an additional lead is applied to the second electrode 18, such as the lead 30 in FIGURE 13. The lead 30 may be permanently bonded to the silver electrode 18 by the use of a conductive cement or any other suitable bonding means. To protect the capacitor, the entire unit is encapsulated in a protective insulating casing 31, which may be made of epoxy for example, with the two leads 20 and 30 extending out through the casing for connection to an electrical circuit. The protective casing 31 may be preformed to fit snugly over the capacitor assembly, or it may be applied as a liquid coating and then solidified directly on the capacitor assembly.

It will be apparent that the specific examples which have been used to illustrate this invention are susceptible of numerous modifications. For example, it is contemplated that many different geometric shapes and configurations for the initial electrodes and the final capacitors will be apparent to those skilled in the art.

From the foregoing detailed description, it can be seen that this invention provides an improved method of manufacturing solid state tantalum capacitors which can be readily practiced on a commercial scale, without subjecting an entire circuit substrate to the anodizing treatment and other process steps involved in producing the solid state capacitors. Since the capacitors remain connected to a common header during most of the manufacturing process, the capacitors can be conveniently handled in relatively large numbers. Moreover, the method is highly reproducible in that it is capable of producing large numbers of solid state tantalum capacitors having characteristics falling within close tolerances. Furthermore, when the preferred etching treatment is employed prior to the anodizing step, the resulting capacitors are characterized by substantially increased capacitance per unit volume, thereby providing improved capacitor volume efficiency.

I claim as my invention:

1. In a method of manufacturing an improved solid state tantalum capacitor, the combination of steps comprising providing a thin sheet of tantalum, stamping a plurality of tantalum electrodes from said sheet with each electrode remaining connected to the residual main body portion of the sheet by a narrow neck portion, bending said neck portions so that the stamped electrodes are at an angle with at least a portion of the residual body portion of the sheet and spaced apart from each other, subjecting the electrodes to an anodizing treatment to form a layer of tantalum oxide on the surface of each electrode, said tantalum oxide forming a dielectric layer integral with each of said tantalum electrodes, and coating the exposed surface of the oxide layer on each electrode with a layer of electrically conductive metal to form a second electrode on the opposite side of the oxide layer from the tantalum electrode.

2. In a method of manufacturing an improved solid state tantalum capacitor, the combination of steps comprising providing a thin sheet of tantalum, stamping a plurality of tantalum electrodes from said sheet with each electrode remaining connected to the residual body portion of the sheet by a narrow neck portion so that the residual body portion provides a common header for the electrodes stamped therefrom, bending the neck portions so as to dispose the stamped electrodes at an angle to at least a portion of said common header, etching the tantalum electrodes to increase the surface area thereof, subjecting the etched surfaces of the tantalum electrodes to an anodizing treatment to form a layer of tantalum oxide on each electrode, said tantalum oxide forming a dielectric layer integral with each tantalum electrode, treating the tantalum oxide layer on each electrode with graphite to permit the bonding of a metal electrode thereto, coating the graphite-treated tantalum oxide on each electrode with a layer of electrically conductive metal to form a second electrode on the opposite side of the tantalum oxide dielectric from the tantalum electrodes, thereby completing a plurality of solid state tantalum capacitors, severing said capacitors from the common header, connecting an electrical lead to the neck portion of each capacitor so that the lead is in direct electrical contact with the tantalum electrode of each capacitor, and encapsulating the two electrodes and the intermediate dielectric layer of each capacitor in a protective insulating casing.

3. In a method of producing an improved solid state tantalum capacitor, the combination of steps comprising providing a thin sheet of tantalum, forming a plurality of tantalum electrodes from said sheet with each electrode being connected to the remaining body portion of said sheet by a narrow neck portion so that the remaining body portion of the sheet provides a common header for all the electrodes formed therefrom, bending said neck portions so that all the electrodes are at an angle with at least a portion of said common header, subjecting said electrodes to an anodizing treatment to form a layer of tantalum oxide on the surface of each electrode, said tantalum oxide forming a dielectric layer integral with each of said tantalum electrodes, coating said dielectric layer with a layer of electrically conductive metal to form a second electrode on the opposite side of said dielectric layer from the tantalum electrode thereby completing a plurality of capacitors, severing said capacitors from the common header, bonding a severed capacitor to a circuit on the surface of an insulating substrate by means of a conductive cement applied to the surface of said second electrode of said capacitor, and encapsulating said capacitor by coating it with an insulating material.

4. In a method of producing improved solid state capacitors, the combination of steps comprising providing a thin sheet of tantalum, stamping a plurality of interfitted generally flag-shaped electrodes from said thin sheet by a single continuous die cut so that the narrow neck portion of each electrode remains connected to the main body portion of the sheet so as to provide a common header for the electrodes stamped therefrom, bending the narrow neck portions of said electrodes so as to dispose the stamped electrodes at an angle to at least a portion of the residual body portion of the tantalum sheet, subjecting the electrodes to an anodizing treatment to form a layer of tantalum oxide on the surface of each electrode, said tantalum oxide forming a dielectric layer integral with each of said tantalum electrodes, coating the exposed surface of the oxide layer on each electrode with a layer of electrically conductive metal to form a second electrode on the opposite side of the oxide layer from the tantalum electrode thereby completing a plurality of capacitors, connecting an electrical lead to the narrow neck portion of each capacitor so that the lead is in direct electrical contact with the tantalum electrode of each capacitor, severing said capacitors from the common header, bonding said capacitors to a circuit on the surface of an insulating substrate by means of a conductive cement secured to the outside surface of said second electrode of each capacitor, said conductive cement being in electrical contact with a predetermined portion of said circuit, and encapsulating each capacitor by coating it with a layer of insulating material with the free end of said electrical lead extending through the insulating coating for electrical connection to another portion of the circuit.

5. In a method of producing improved solid state tantalum capacitors, the combination of steps comprising providing a thin sheet of tantalum, forming a plurality of tantalum electrodes from said sheet with each electrode being connected to the remaining body portion of the sheet by a narrow neck portion so that the remaining body portion of the sheet provides a common header for all the electrodes formed therefrom, bending said neck portions so that the electrodes are all at an angle with at least a portion of the common header, subjecting the electrodes to an anodizing treatment to form a layer of tantalum oxide on the surface of each electrode, said tantalum oxide forming a dielectric layer integral with each of said tantalum electrodes, coating the oxide layer on each electrode with a layer of electrically conductive metal to form a second electrode on the opposite side of the oxide layer from the tantalum electrode thereby completing a plurality of solid state tantalum capacitors, connecting a first electrical lead to the narrow neck portion of each capacitor so that the lead is in direct electrical contact with the tantalum electrode, connecting a second electrical lead to the exposed surface of said second electrode of each capacitor, and encapsulating each capacitor and its two electrodes in a protective insulating casing with the free ends of said electrical leads extending through said casing for connection to an electrical circuit.

No references cited.

JOHN F. CAMPBELL, *Primary Examiner.*

WILLIAM I. BROOKS, *Examiner.*